March 29, 1966  H. KALB  3,242,936
HYDRAULIC SPEED REGULATOR FOR ENGINES AND MOTORS
Filed Sept. 4, 1962  4 Sheets-Sheet 1

Inventor
HANS KALB
By Toulmin & Toulmin
Attorneys

Inventor
HANS KALB

By Toulmin & Toulmin
Attorneys

March 29, 1966 H. KALB 3,242,936
HYDRAULIC SPEED REGULATOR FOR ENGINES AND MOTORS
Filed Sept. 4, 1962 4 Sheets-Sheet 3

Inventor
HANS KALB
By Toulmin & Toulmin
Attorneys

INVENTOR
HANS KALB
BY Toulmin & Toulmin
ATTORNEYS

United States Patent Office 3,242,936
Patented Mar. 29, 1966

3,242,936
HYDRAULIC SPEED REGULATOR FOR
ENGINES AND MOTORS
Hans Kalb, Galvanistr. 19, Nurnberg, Germany
Filed Sept. 4, 1962, Ser. No. 220,988
Claims priority, application Germany, Sept. 7, 1961,
K 44,658; July 26, 1962, K 47,340
15 Claims. (Cl. 137—19)

This invention relates to a hydraulic speed regulator for engines and motors which controls the speed thereof by means of an oil-actuated servo-motor which acts upon suitable devices to throttle or restrict the delivery of fuel or pressure fluid to the engine or motor.

Hydraulic speed measuring devices are known which respond in a linear or quadratic manner to a wide range of speeds, but whose measurements must be converted to practical values by transformation devices of one kind or another.

The speed regulator of this invention combines all necessary devices for speed regulation, so that no additional transformation devices are required. The delivered or modulated pressure of this regulator acts only within permitted limits between the maximum pressure of the oil supply and zero pressure. From this it follows that this regulator is superior to known spring-controlled speed regulators.

The speed regulator according to this invention is characterized in that a control valve that is centrifugally controlled by the motor is urged radially by hydraulic pressure against a radial opening which is also under hydraulic pressure.

The centrifugally controlled valve element is in the form of a ball which is freely movable in a radial bore in a body mounted on a motor driven shaft, so that the radially outwardly facing side of the ball is exposed to hydraulic pressure, while the inner side of the ball faces toward an opening that is also under hydraulic pressure.

The valve element can however also be in the form of a membrane that is in a position perpendicular to a radial line drawn to the rotating element so as to be responsive to centrifugal force.

Finally the valve element can be in the form of a piston with a truncated conical supporting surface provided with tangentially curved radial grooves.

The hydraulic pressure on both sides of the valve element is derived from a single source of pressure fluid. The proportionality ratio of the regulator is therefore established by a valve element that is interposed between the fluid delivery ports on the radially outer and inner sides thereof.

For manual adjustment of the speed regulator, there is provided a relief valve with a handwheel in the passageway to the outer side of the valve. In this manner the speed can be adjusted hydraulically over a wide range, and the adjustment can be controlled at a distance from the engine or motor.

In order to obtain the necessary quickness of adjustment when there is a sudden acceleration or retardation of speed, the regulator is provided with an acceleration responsive device that does not respond to the absolute speed but only to sudden changes of speed, in response to which it will amplify the normal functioning of the regulator. For this purpose the rotating member in which the valve is located also carries another centrifugally responsive weight pivoted on a parallel axis so that it will assume a radial position during constant speed, but will deviate from the radial direction whenever the speed is accelerated or retarded, and during such deviation will control the fluid pressure relief so as to vary the fluid pressure in the radial passage at the inner side of the valve.

The regulator will also compensate for pressure or viscosity changes in the oil supply so that disturbances like these will not have any effect. It is constructed in such a manner that when the speed increases, the pressure of the oil supply will diminish, and it will also diminish when there is any leakage in the oil conduits so that the motor will then be stopped.

The manually adjustable pressure relief valve can be coupled with the admission valve in such a manner that the proportionality ratio will remain constant throughout the entire speed range.

The regulator includes the additional novel features hereinafter described and shown on the drawings, wherein—

In the two bearings 2 and 3 there is rotatably supported a rotor 1 which is driven by the engine to be regulated. The rotor is provided with a radial cylindrical bore 4 for receiving a hardened steel ball 5 slightly smaller in diameter than the bore. The ball 5 serves simultaneously as a centrifugal weight, as a closure member, and as a movable piston.

Figure 1:
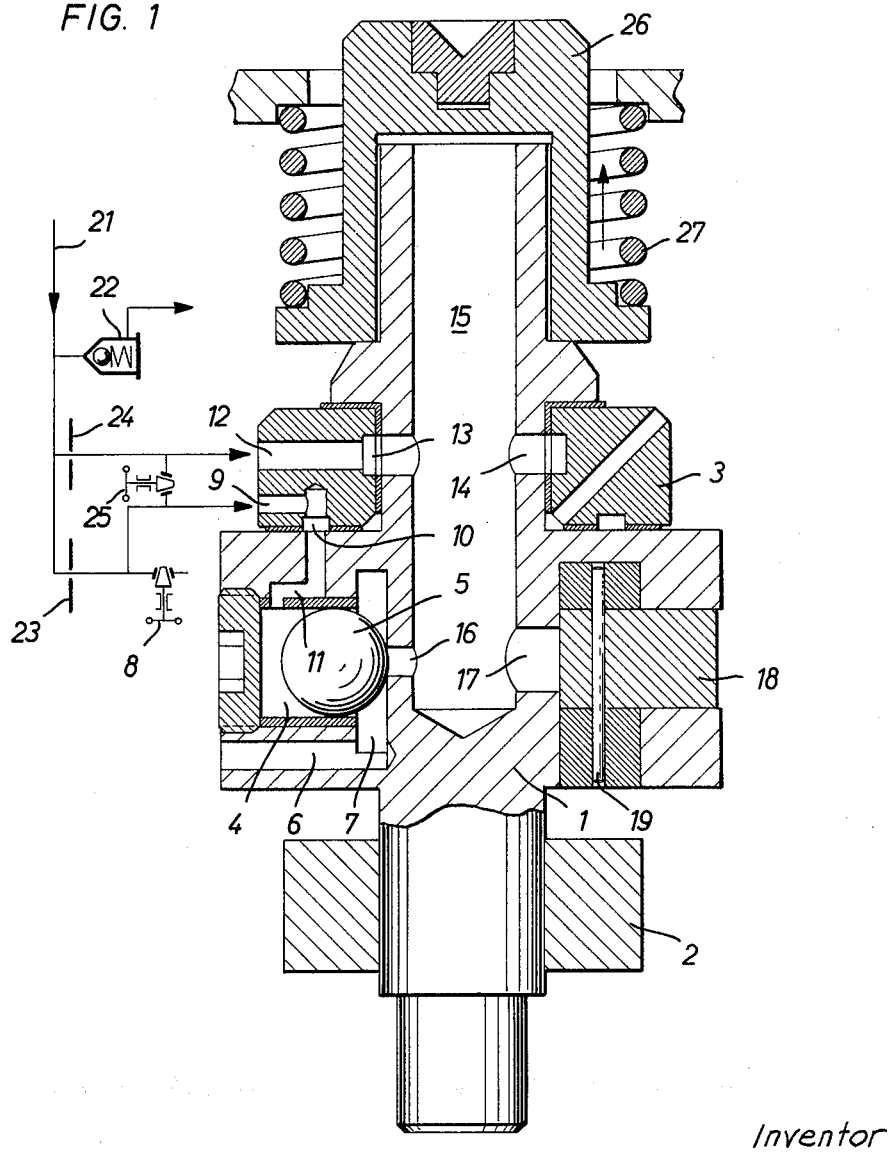
FIGURE 1 is an axial section through one form of regulator in which a ball is used as the valve.

The regulator of FIGURE 1 is supplied with oil from a conduit 21 connected with a bypass valve 22 for keeping the pressure constant. The oil first passes through a throttling system 23 comprising a throttle valve 25 which is initially closed, and from there it is delivered through a radial passageway 9 in the sealing ring 3 to the circular canal 10, and from there through the passageway 11 to the radial cylinder 4. This oil, which may be called the "adjustment" oil, is kept at the required pressure by adjusting the throttle valve 8. The pressure oil proper is delivered from the throttling system 24 and through the radial passageway 12 in the ring 3 to the circular canal 13, and from there through the radial passageway 14 of the rotor 1 to its axial bore 15. This oil then acts upon the servocylinder 26 to lift it against the force of the spring 27. The servocylinder has a fluid-tight bore which is kept lubricated by the pressure oil itself.

Figure 2:
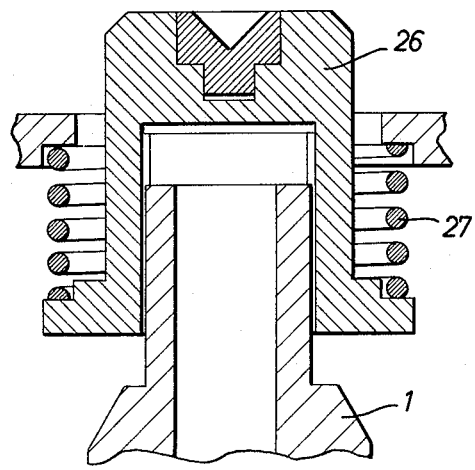
FIGURES 2 to 5 are cross-sectional detail views of the device shown in FIGURE 1.

When the speed of rotation is zero, the oil pressure in the cylinder 4 presses the ball 5 against the opening of the radial passageway 16 so as to close the same. The oil pressure in the axial bore 15 will then reach its maximum value and will lift servocylinder 26 against the force of the spring 27 to its highest point, as shown in FIGURE 2. When the rotor 1 begins to rotate, the ball 5 which is immersed in oil will assume a position of equilibrium between the oil pressure in the cylinder 4 and the centrifugal force on the ball in conjunction with the oil pressure in the radial passageway 16, so as to lift the ball away from the opening of this passageway. As the speed increases, the ball will move further away from the passageway 16 and the pressure in the axial bore 15 will diminish. The servocylinder 26 will then move from the "open" position shown in FIGURE 2 to the "closed" position shown in FIGURE 1. During these movements the upward motion of the servocylinder and the oil pressure in the axial bore will remain exactly proportional to each other. The reverse of these movements will occur when the speed of rotation diminishes. The oil that is pressed out from the axial bore 15 will pass through the radial passageway 16 and the circular space 7, and from there will escape through the duct 6 to the open.

The static condition of the regulator, and specifically of the ball 5, is determined by the oil pressure in the passageway 16, which in turn depends on the proportionality factor of the regulator. The servocylinder 26 acts upon devices for controlling the supply of fuel or pressure fluid to engines or motors.

Figure 3:
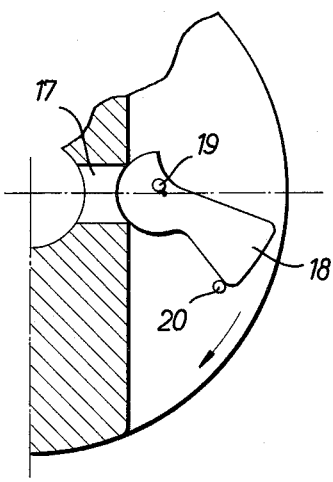
Figure 4:
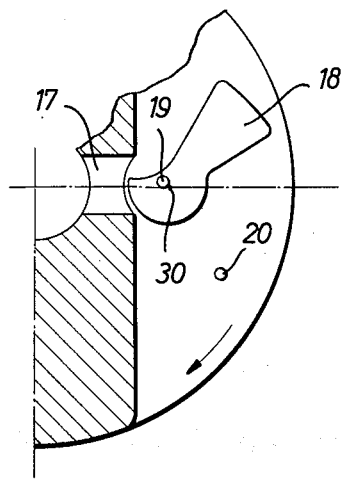
Figure 5:
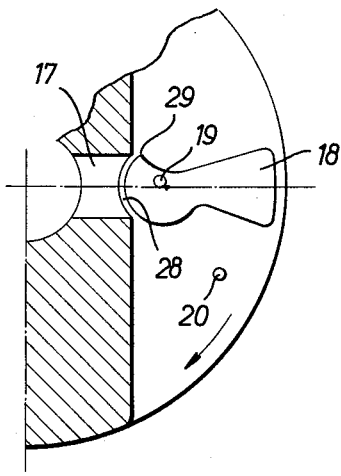

When engines or motors are subjected to sudden changes of load, their speed governors must respond quickly. With hydraulic devices, this requires acceleration responsive devices, and in FIGURES 3, 4, 5 and 10 such devices are shown in different positions of operation. The acceleration device consists of a weighted member 18 pivoted on an axis 19 parallel to but spaced from the axis of rotation of the rotor 1. At constant speed the member 18 will assume a radial position as shown in FIGURE 5, almost completely closing the passageway except for a narrow clearance space between the member 18 and the rotor 1. If the engine or motor suddenly accelerates, the member 18 will move into the position shown in FIGURE 4, where its edge 29 has cleared a considerable portion of the end of the radial passageway 17 so as to allow the oil in the axial bore 15 to escape more freely and thus effect a lowering of the fluid pressure in that space. This will permit the spring 27 to depress the servomotor cylinder 26 to its "close" position before the engine or motor has had time to increase its speed appreciably. Sudden retardation of the speed will produce the result shown in FIGURE 3. The member 18 will be moved further in the clockwise direction so as to reduce the clearance around the passageway 17 which will cause the fluid pressure in the axial bore 15 to build up and lift the servocylinder 26 against the force of the spring 27 to the "open" position for the admission of more fuel or pressure fluid to the engine or motor.

For changing the speed, a needle valve 8 is provided to control the fluid pressure in the cylinder 4.

For changing the pressure ratio, the valve 25 is provided which permits small amounts of adjustment oil to become mixed with servomotor oil. Since the pressure of the servomotor oil can vary, within the established pressure ratio, between maximum pressure and zero, while the pressure of the adjustment oil assumes a constant value at each speed, it necessarily follows that by providing a bypass from the one to the other, the pressure of the adjustment oil can be varied. With increasing servomotor pressure, the adjustment oil pressure can therefore be similarly increased, while with decreasing servomotor pressure it can be reduced. Since these two pressures vary simultaneously, their ratio, which has a definite initial value at maximum speed, can be made as small as desired.

Figure 9:
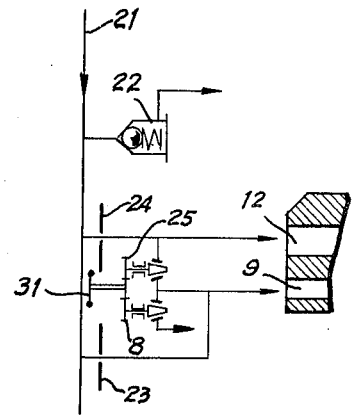
FIG. 9 is a diagrammatic view, partly in cross-section, showing a modification of the apparatus at the left side of FIG. 1.
Figure 10:
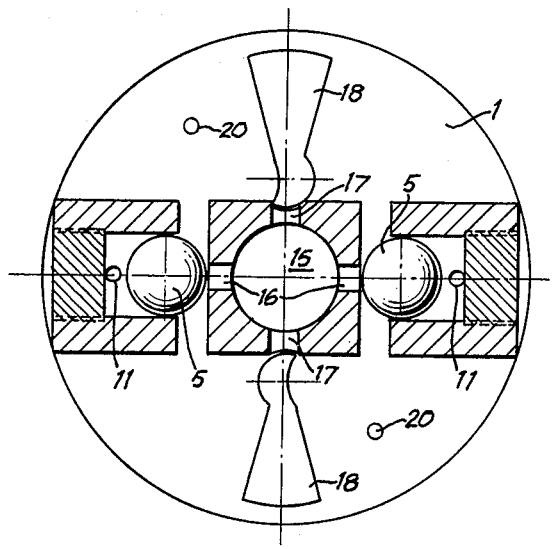
FIG. 10 is a transverse cross-section through a modified form of rotor.

If the valves 8 and 25 are connected to each other as at 31 in FIG. 9 for operation in unison, then a change of speed will produce a simultaneous change of pressure ratio. This expedient also makes it possible, throughout the entire range of speeds, to maintain constant pressure ratio.

Figure 8:
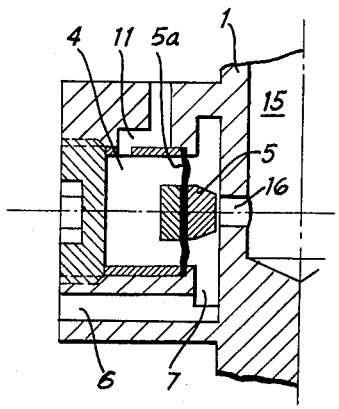
FIG. 8 is an axial cross-section of a portion of a modified rotor using a diaphragm valve.

In place of the ball 5 it is also possible to use a membrane or diaphragm 5a as shown in FIGURE 8 which is acted upon by the adjustment pressure from one side, while the other side of it controls the opening through the passageway 16.

The functioning of such a speed regulator, and especially its sensitivity, can be considerably improved if the valve element is in the form of a slidable plunger with a truncated conical end face having tangentially curved grooves in it, to serve as a seating surface. The servomotor oil streaming through these grooves causes the plunger to rotate, so as to overcome the static friction and thus increase the sensitivity of the valve.

Valve elements in the form of plungers, although having the same outside dimensions, can be given different masses by hollow boring so that when a plurality of them are fitted to the same rotor, they will come into action successively. Successive operation can however also be secured by making the plungers of different diameters.

In order to produce a nonlinear change of oil pressure on the servocylinder during change of speed, the oil conduit leading to the outer side of the plunger can be inclined to the rotor axis. This conduit will then act as a sort of centrifugal pump. By varying the effective length of such a conduit, and without changing the pressure of the adjustment oil, the range of speeds can be widened or narrowed, while with varying oil pressures the forces exerted on the plungers will vary quadratically.

Figures 6, 7:
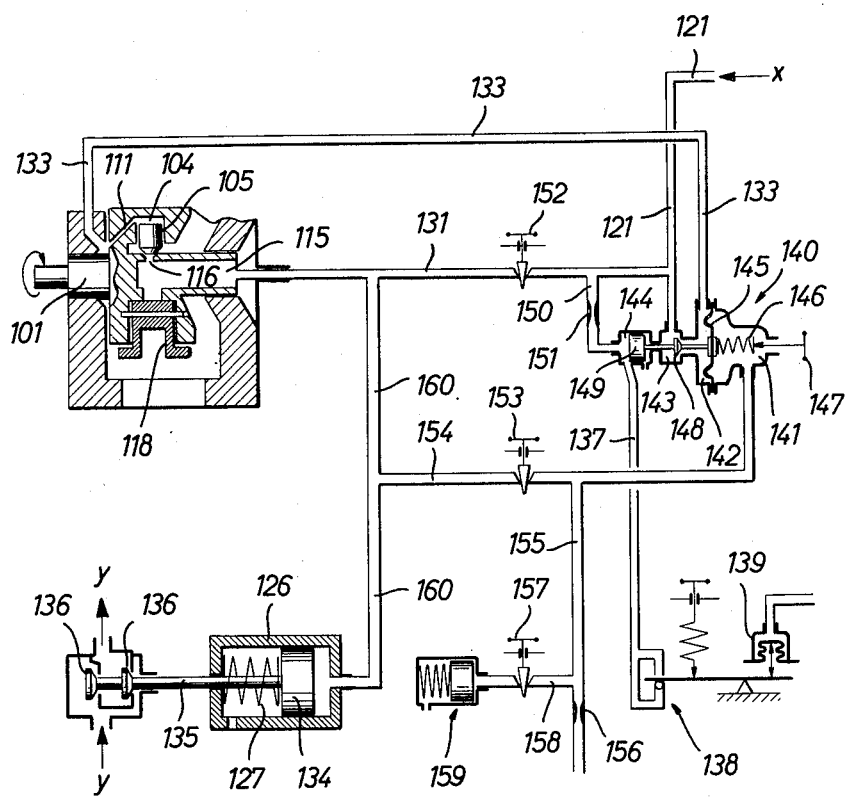
FIGURE 6 is an axial section through a second form of regulator, in which the valve is in the form of a piston.
FIGURE 7 is a plan view of the seating surface of the valve in FIGURE 6.

Such a construction is shown in FIGURE 6 where the rotor 101 is driven from the engine or motor whose speed is to be regulated. The axial bore 115 of this rotor is supplied with oil from a supply conduit 121. This axial bore is in communication through a radial passageway 116 with a radial bore 104 in which is slidably positioned a plunger 105 whose inner end is of truncated conical form and has radial tangentially curved grooves 132 therein as shown in FIGURE 7, to serve as a valve for controlling the effective size of the passageway 116. The radial bore 104 communicates with the oil conduit 133 through an inclined duct 111. Diametrically opposite the plunger 105 there is a pivoted acceleration member 118 which functions in the same manner as the member 18 in FIGURE 1. The conduit 131 communicates with a conduit 160 which leads to a servocylinder 126 in which the piston 134 is movable by fluid pressure in opposition to the spring 127. The servo-piston 134 acts through a piston rod 135 upon two parallel valve sections 136 which control the flow of fuel or pressure fluid to the engine or motor in the direction of the arrows y. Connected to the oil supply conduit 121 is a pressure regulating valve 140 which comprises a low pressure chamber 141, a high pressure chamber 142, a throttle chamber 143, and a bypass chamber 144. The low pressure space 141, which is separated from the high pressure space by a diaphragm 145, contains a spring 146 whose pressure is controlled by the handwheel 147. On its high pressure side the membrane 145 has firmly attached to it a valve 148 which controls communication between the throttling space 143 and the high pressure space 142, and also a bypass piston 149 for acting upon the valve 148 in opposition to the spring 146. The bypass chamber 144 is connected to a conduit 137 which leads to a pressure regulator 138 controlled by the pressure responsive device 139 for regulating the escape of oil through the bypass chamber. The oil that is delivered to the bypass chamber 144 passes from the conduit 121 into the conduit 150, through the restricted orifice 151, and from there into the chamber 144. In the conduit 131, just beyond its junction with conduit 150, there is a manually controlled valve 152. The oil chamber 143 of the pressure regulataing valve 140 is in communication with the oil supply conduit 121, while the low pressure chamber 141 is connected to a conduit 154 in which there is a manually adjustable needle valve 153. Between the pressure regulating valve 140 and the needle valve 153, the conduit 154 is connected to a conduit 155 containing a restricted portion 156. Between this restricted portion and the conduit 154, a branch conduit 158 containing a needle valve 157 connects the conduit 155 with the cylinder of a timing device 159 containing a plunger with a spring behind it, the rear portion of the cylinder being open to the atmosphere.

In the operation of the device shown in FIGURE 6, the oil from the supply conduit 121 flows with full pressure into the throttle chamber 143, and also into the high pressure chamber 142 when the valve 148 is open, where the oil pressure will act upon the diaphragm 145 and against the spring 146. By operating the handwheel 147 to change the tension of the spring, the pressure of the oil in the conduit 133 can be adjusted and kept constant. Since the speed responsive device itself contains no springs and no lower limit of sensitivity, the speed of rotation can be brought down to nearly zero.

From the oil supply conduit 121 the oil passes through the needle valve 152 and into the axial bore 115 of the rotor 101 by which its pressure is modulated in accordance with the speed of rotation, just as in the device in FIGURE 1. The oil with its pressure thus modulated is delivered through the conduit 160 to the servocylinder 126 to actuate the piston 134 and piston rod 135 to operate the valve 136 for controlling the delivery of fuel or pressure fluid to the engine or motor. For the performance of these functions, the speed regulator is first adjusted to have a prescribed pressure ratio.

By opening the needle valve 153, the modulated oil from the conduit 160 is conducted through the conduit 154 and into the low pressure chamber 141 of the pressure regulating valve 140 where it acts upon the diaphragm 145, and will henceforth be called the "compensation oil." Connected in parallel with this low pressure chamber are the fixed restriction 156 and the timing device 159, which takes up or gives off compensation oil through the needle valve 157. The pressure of the compensation oil in the low pressure chamber 141 of the pressure regulating valve 140 will change in proportion to the pressure difference produced by operation of the needle valve 153, and will act upon the membrane 145 in opposition to the spring 146. In this manner the pressure ratio of the regulator can be reduced as much as desired, or brought down to zero.

During increase of speed, because of centrifugal force acting upon the valve 105 to cause it to open the radial passageway 116, the oil pressure in the axial bore 115 and in the conduit 160 will diminish. The spring 127 of the servomotor will then retract the piston rod 135, causing the valve 136 to move toward the closed position. In proportion to this drop of pressure in the conduit 160, the pressure of the compensation oil in the conduit 155 will also diminish proportionately, which will reduce the counterpressure against the diaphragm 145, and the valve 148 moves toward closing position with the establishment of a reduced pressure in the conduit 133. Upon reduction of the adjustment oil pressure the valve 105 will move further away from the radial bore 116, resulting in a further diminution of pressure in the axial bore 115 and conduit 160, and a further throttling of the valve 136. The speed of the engine or motor will therefore drop in proportion to the change of pressure of the oil in the conduit 133, so as to compensate the pressure ratio. During reduction of speed, compensation occurs in the reverse direction.

By further opening of the needle valve 153, a pressure ratio can be set up in the reverse direction so that upon additional loading of the engine or motor, its speed will be increased to a prescribed value, or upon relieving it of some of its load, the speed will diminish. Such negative compensation should be advantageous in the regulation of compressors or pumps. There will be a slight lag of a few seconds in the response to changes of adjustment of the compensation, but the time constant can be adjusted by means of the needle valve 157.

With the apparatus shown in FIGURE 6, an engine or motor can also be controlled from a distance. The handwheel 147 is first adjusted for maximum speed. The oil from the supply conduit 121, after passing through the constriction 151, traverses the chamber 144 where it presses against the piston 149 which transmits the pressure through the valve 148 to the membrane 145. The pressure regulator 138, whose actuator 139 has been properly adjusted, is then operated to control the escape of oil from the conduit 137. This will result in a change of pressure in the conduit 133, which will change the speed of the engine or motor.

The devices hereinabove described can be operated, not only with liquids, but also with gases, and can be modified in various ways within the scope of the claims.

What is claimed is:

1. In a hydraulic speed regulator for a prime mover wherein the speed of the prime mover is regulated by a fluid servomotor controlled by fluid pressure; a rotor adapted for being driven by the prime mover and provided with a central axial bore and radial bore means located outwardly of the axial bore, passage means leading from said axial bore to the radially inner end of said radial bore means, radially moveable valve element means in said radial bore means adapted by movement in the radial bore means toward said radially inner end thereof to restrict said passage means, said valve element means having a radially inner side exposed to fluid in the radially inner end of the radial bore means and a radially outer side exposed to fluid in the radially outer end of said radial bore means, a source of fluid under pressure, means for supplying fluid from said source to said axial bore and to the radially outer end of said radial bore means, means for exhausting fluid from the radially inner end of said radial bore means, said valve element means being actuated in radial movement in the radial bore means solely by fluid pressures acting on the radially inner and radially outer sides thereof and by centrifugal forces developed thereon by rotation of said rotor, and means operatively connecting said servomotor with said axial bore for actuation of the servomotor in conformity with the fluid pressure in said axial bore.

2. The speed regulator of claim 1, in which the valve element means comprises spherical body means in said radial bore means and slightly smaller in diameter than said radial bore means so as to be freely moveable therein.

3. The speed regulator of claim 1, in which the valve element means comprises flexible membrane means in said radial bore means positioned transversely therein and located between and hydraulically isolating the radially inner and radially outer ends of said radial bore means.

4. The speed regulator of claim 1, which includes a manually operated valve connected to the radially outer end of said radial bore means to control the pressure therein.

5. The speed regulator of claim 1, which includes a relief valve connected to the radially outer end of said radial bore means.

6. The speed regulator of claim 1, in which second passage means is provided leading from the axial bore to exhaust, acceleration-responsive valve means pivoted for free swinging movement about an axis parallel to but spaced from the axis of rotation of the rotor, said valve means being positioned in operative relation to said second passage means and being operable upon pivotal movement for variably restricting said second passage means to control the escape of fluid from the said axial bore via second passage means, the center of gravity of the pivoted valve means being spaced radially outwardly from the pivot axis of said valve means so that the rotated position of the valve means on the pivot axis thereof will change when the speed of rotation of the rotor changes.

7. The speed regulator of claim 6 in which said radial bore means comprises a plurality of radial bores distributed circumferentially of said rotor, and said acceleration-responsive valve means comprise a plurality of valve means positioned between said radial bores.

8. The speed regulator of claim 1, in which a manually operated valve is connected between said source and the radially outer end of said radial bore means and an adjustable relief valve is connected between the radially outer end of said radial bore means and exhaust, and a common operating means is provided for actuating the manually operated valve and the relief valve in unison.

9. The speed regulator of claim 1, in which the valve element means comprises piston means with conical seating surface, said seating surface provided with tangentially inclined radial grooves for causing rotation of the piston means by fluid flowing through said passage means.

10. The speed regulator of claim 1, which said radial bore means comprises a plurality of radial bores and said valve element means comprises a valve element in each radial bore and in which the valve elements have different dimensions so that they will come into action successively during change of speed of said rotor.

11. The speed regulator of claim 1, in which said means for supplying fluid from said source to the radially outer end of said radial bore means includes passage means in the rotor inclined to the axis of rotation of the rotor so as to produce non-linear change of oil pressure during change of speed of the rotor.

12. The speed regulator of claim 1 in which said means for supplying fluid from said source to the radially outer end of said radial bore means includes a pressure regulating valve having its inlet connected to said source and its outlet connected to the radially outer end of said radial bore means, said valve comprising a diaphragm having one side forming one wall of a high pressure chamber in communication with the said outlet, a spring acting on said diaphragm in opposition to the pressure in said chamber, and a throttle valve connected to the diaphragm and positioned between said inlet and outlet and movable for varying the degree of restriction to fluid flow therebetween.

13. The speed regulator of claim 12, in which a second chamber is provided of which the other side of said diaphragm forms one wall, a conduit leading from said axial bore to said second chamber, a manually operated valve in said conduit, and time delay means connected to said conduit between said manually operated valve and said second chamber.

14. The speed regulator of claim 12, which includes a piston connected to said throttle valve, a cylinder in which said piston is movable, a restrictor connecting said outlet with said cylinder, the pressure conveyed to the cylinder via the restrictor biasing said piston to urge the throttle valve in a direction opposed to the spring force thereon, and an adjustable pressure regulator connected between said cylinder and exhaust.

15. The speed regulator of claim 1, in which said source of fluid under pressure is a source of gaseous fluid.

References Cited by the Examiner
UNITED STATES PATENTS

| | | | |
|---|---|---|---|
| 2,155,247 | 4/1939 | Warner | 137—56 |
| 2,447,779 | 8/1948 | Taplin | 137—34 X |
| 2,702,560 | 2/1955 | Bobier | 137—56 X |
| 2,869,565 | 1/1959 | Cliborn | 137—58 |
| 3,023,761 | 3/1962 | Greenlees | 137—56 |

ISADOR WEIL, *Primary Examiner.*

CLARENCE R. GORDON, *Examiner.*